United States Patent
Mahaffy et al.

(10) Patent No.: US 12,529,350 B2
(45) Date of Patent: Jan. 20, 2026

(54) SENSITIZING ROCKET PROPULSION ENGINE

(71) Applicant: EXQUADRUM, INC., Victorville, CA (US)

(72) Inventors: Kevin E. Mahaffy, Victorville, CA (US); Mark Heiner, Victorville, CA (US); Elias Wilson, Victorville, CA (US)

(73) Assignee: EXQUADRUM, INC., Victorville, CA (US)

( * ) Notice: Subject to any disclaimer, the term of this patent is extended or adjusted under 35 U.S.C. 154(b) by 0 days.

(21) Appl. No.: 18/443,061

(22) Filed: Feb. 15, 2024

(65) Prior Publication Data

US 2024/0280068 A1 Aug. 22, 2024

Related U.S. Application Data

(60) Provisional application No. 63/485,617, filed on Feb. 17, 2023.

(51) Int. Cl.
*F02K 9/72* (2006.01)

(52) U.S. Cl.
CPC ..................... *F02K 9/72* (2013.01)

(58) Field of Classification Search
CPC ... F02K 9/08; F02K 9/42; F02K 9/425; F02K 9/72; F02K 9/24; F02K 9/563
See application file for complete search history.

(56) References Cited

U.S. PATENT DOCUMENTS

| | | | | |
|---|---|---|---|---|
| 3,228,188 A * | 1/1966 | Sargent | ..................... | F02K 9/82 60/254 |
| 3,305,413 A * | 2/1967 | Flynn | ..................... | C06B 31/00 149/40 |
| 3,812,671 A * | 5/1974 | Burr | .......................... | F02K 9/70 60/39.47 |
| 4,132,165 A * | 1/1979 | Leeson | ..................... | F02K 9/50 60/225 |
| 5,119,627 A * | 6/1992 | Bradford | .................. | F02K 9/72 102/288 |
| 10,501,385 B1 * | 12/2019 | Buckner | ................... | F02K 9/08 |
| 2018/0245543 A1 * | 8/2018 | Engelhardt | ............... | F02K 9/34 |

* cited by examiner

*Primary Examiner* — Thuyhang N Nguyen
(74) *Attorney, Agent, or Firm* — Merchant & Gould P.C.

(57) ABSTRACT

A rocket propulsion engine includes a propellant vessel, a sensitizer vessel, a combustion chamber, an exhaust nozzle, and a controllable sensitizer injector. The combustion chamber combusts combustible propellant received from the propellant vessel and the combustion gas produced therefrom is exhausted through the exhaust nozzle. When activated, the controllable sensitizer injector introduce sensitizer from the sensitizer vessel into the propellant vessel to form an explosive mixture of the combustible propellant and the sensitizer. A method of operating a rocket propulsion engine includes supplying a combustible propellant from the propellant vessel into the combustion chamber, combusting the combustible propellant within the combustion chamber, and exhausting combustion gas produced through the exhaust nozzle. The method also includes introducing the sensitizer from the sensitizer vessel into the propellant vessel to form an explosive mixture within the propellant vessel.

20 Claims, 4 Drawing Sheets

SENSITIZING ROCKET PROPULSION ENGINE

This invention has been made with Government support under Contract Numbers HQ0860-22-C-7813 and HQ0860-24-C-7113, awarded by the Missile Defense Agency (MDA). The Government has certain rights in the invention.

FIELD

This disclosure relates to rocket propulsion engines.

BACKGROUND

Rockets can include one or more rocket propulsion engines that generate thrust to accelerate the rocket. Such rockets may be used within the earth's atmosphere and/or in space. Rocket propulsion engines can combust a non-gas propellant to generate combustion gas which is then expelled from the rocket propulsion engine generating thrust. Thrust can be generated for the initial take-off of the rocket (e.g., acceleration of the rocket to cause take-off, acceleration during an acceleration stage of the rocket) and for changing the trajectory of the rocket during flight.

SUMMARY

A rocket propulsion engine is described that includes a propellant vessel containing combustible propellant, a combustion chamber, an exhaust nozzle, and a sensitizer vessel containing sensitizer. Combustion gas is produced by combustion of the combustible propellant within the combustion chamber and is exhausted through the exhaust nozzle to generate thrust. The rocket propulsion engine is configured to form an explosive mixture of the sensitizer and the combustible propellant within the propellant vessel. The explosive mixture can then be detonated destroying the rocket propulsion engine.

The rocket propulsion engine can include a controllable sensitizer injector, such as a sensitizer flow controller and/or an ejector, that is controllably activatable to introduce the sensitizer from the sensitizer vessel into the propellant vessel to form the explosive mixture within the propellant vessel. When present, the sensitizer flow controller is activatable in a manner to allow the sensitizer to flow through a sensitizer flow path fluidly connecting the sensitizer vessel and the propellant vessel. When present, the ejector is activatable in a manner to cause the ejector to push the sensitizer out of the sensitizer vessel and into the propellant vessel.

The rocket propulsion engine can include a detonator that is activatable to detonate the explosive mixture formed within the propellant vessel. The propellant vessel can include the detonator.

In an embodiment, the combustion chamber is fluidly connected to the propellant vessel via a propellant flow path to receive combustible propellant therefrom, and the exhaust nozzle is fluidly connected to the combustion chamber so as to exhaust the combustion gas produced in the combustion chamber resulting from combustion of the combustible propellant. The sensitizer vessel is fluidly connected to the propellant vessel via a sensitizer flow path. When present, the sensitizer flow controller is disposed in the sensitizer flow path.

In an embodiment, the combustion chamber includes an ignitor, the propellant vessel includes a detonator, and the rocket propulsion engine includes a controllable sensitizer injector. The propellant flow controller is activatable to supply the combustible propellant from the propellant vessel to the combustion chamber. The ignitor is activatable to heat and combust the combustible propellant within the combustion chamber to produce combustion gas which is exhausted through the exhaust nozzle. The controllable sensitizer injector is activatable to introduce the sensitizer from the sensitizer vessel into the propellant vessel. The detonator is activatable to cause a detonation of the explosive mixture within the propellant vessel. For example, a controller for the rocket propulsion engine can be configured to active the propellant flow controller, the ignitor, the controllable sensitizer injector, and the detonator.

In an embodiment, a method is directed to operating the rocket propulsion engine. The method includes supplying the combustible propellant from the propellant vessel into the combustion chamber, combusting the combustible propellant within the combustion chamber to produce the combustion gas, and exhausting the combustion gas through the exhaust nozzle to generate thrust. The method also includes introducing sensitizer from a sensitizer vessel into the propellant vessel to form the explosive mixture within the propellant vessel, and detonating the explosive mixture within the propellant vessel.

DRAWINGS

Like numbers represent like features.

DETAILED DESCRIPTION

The terms "combustion" and "combust" as used herein refer to an exothermic reaction of a substance caused by sufficient heating of the composition (e.g., above atmospheric temperature) which produces gas (i.e., combustion gas). For example, the reaction may be a redox reaction or a decomposition reaction.

The term "explosive" as used herein refers to a substance that (when sufficiently heated or physically shocked) combusts forming a supersonic shock wave. For example, an explosive substance has a flame speed that is greater than the speed of sound through said explosive composition.

The term "monopropellant" refers to a type of propellant that combusts without being mixed with another component, such as an oxidizer (e.g., air, oxygen, or the like). For example, the reaction/combustion of a monopropellant is an exothermic decomposition reaction in which the monopropellant decomposes into the combustion gas. The heating of the combustion gas by the decomposition reaction further expands the combustion gas generating a larger volume of gas.

Rockets include rocket propellant engines which are used for propelling the rocket. Exemplary uses for rockets can include, but are not limited to, transporting cargo through the atmosphere and/or space, space exploration, mining (e.g., asteroid mining), or the like. During flight, a self-destruction of the rocket may be desired. For example, self-destruction may be desired due to, but not limited to, an in-flight malfunction, cleanup (e.g., getting rid of the rocket after completing its mission), nearby target destruction (e.g., destruction of an asteroid or other target), or the like. A rocket containing an explosive capable of causing timely destruction of the rocket prior to launch can present a safety issue as a rocket containing a relatively large amount of explosive is dangerous due to the chance of accidental detonation for example from natural degradation of the explosive, from cook off, from jostling/impacting of the rocket, or the like. The rocket and the rocket propulsion engine described herein are safer due to not containing a self-destruction capable explosive prior to launch. Instead, as described in more detail below, an explosive that is detonable to cause self-destruction of the rocket propellant engine is formed only after the launch of the rocket. Once the rocket is launched, unused/remaining propellant is used to form a self-destruction capable explosive, and there is no need for the rocket to contain a separate explosive/composition just for self-destruction of the rocket.

Figure 1:
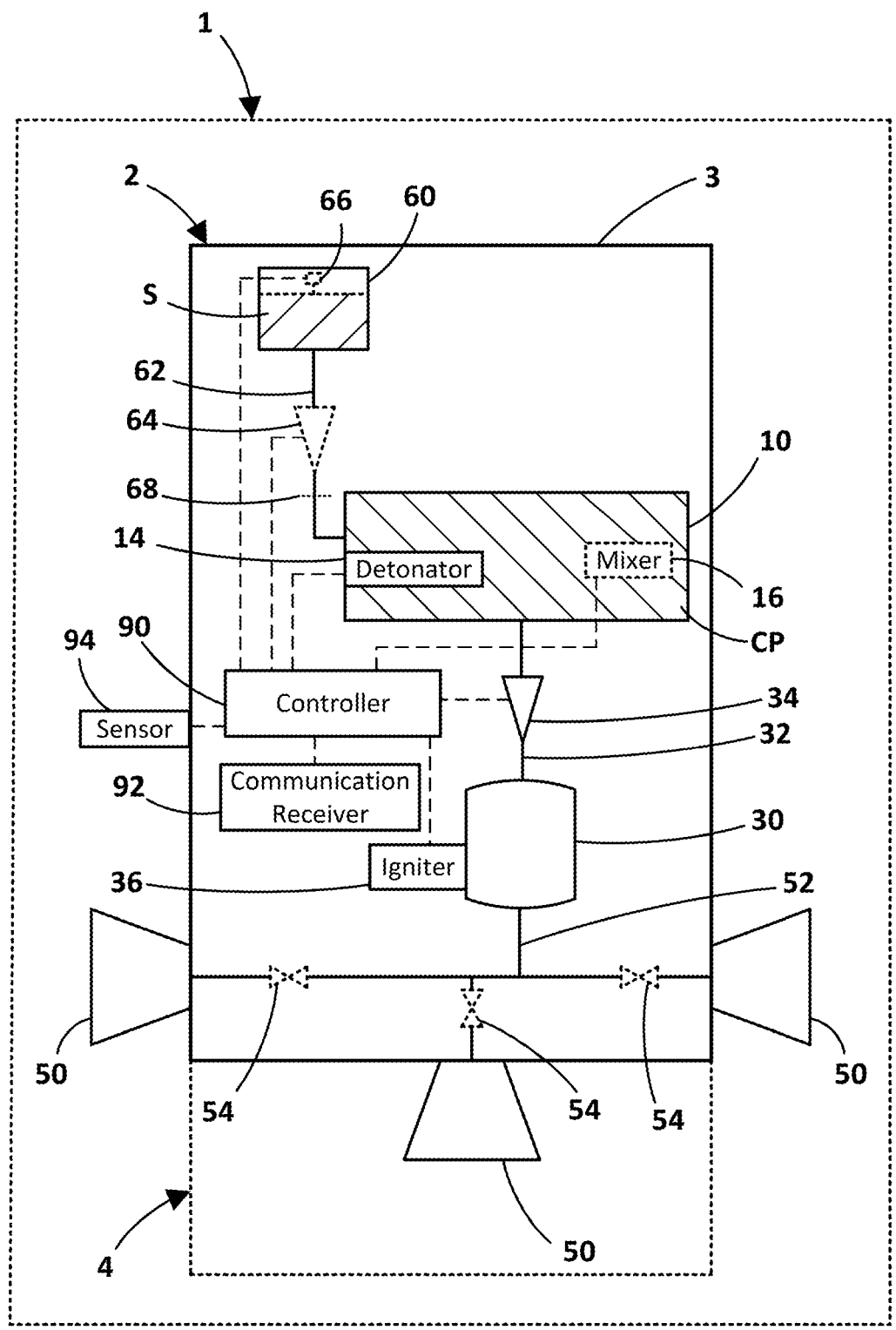
FIG. 1 is a schematic diagram of an embodiment of a rocket propulsion engine for a rocket.

FIG. 1 is a schematic diagram of an embodiment of a rocket propulsion engine 2 for a rocket 1. The rocket propulsion engine 2 generates thrust for accelerating the rocket 1 and/or used for adjusting the thrust vector of the rocket propulsion engine 2 (and therefore the trajectory of the rocket 1) during flight. Changes in the thrust vector changes the relative flight direction (i.e. trajectory) of the rocket 1.

In an embodiment, the rocket propulsion engine 2 can provide both the primary acceleration engine of the rocket 1 (e.g., primary source of thrust during an initial acceleration stage of the rocket 1) and midflight attitude control of the rocket 1. For example, the rocket propulsion engine 2 can be the only propulsion engine within the rocket 1 (i.e., the rocket 1 having a single rocket propulsion engine).

Figure 2A:
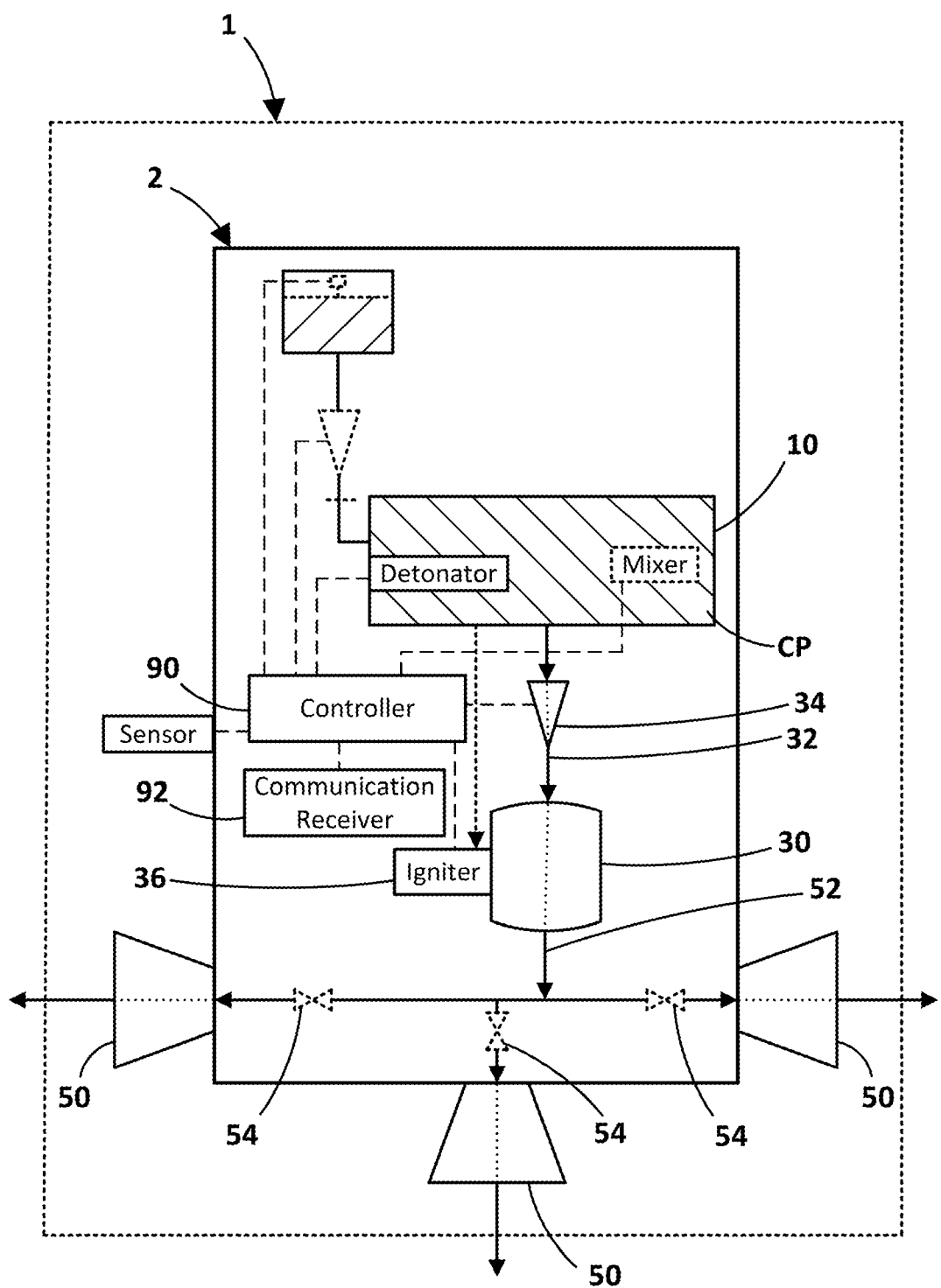
FIG. 2A is a schematic diagram of the rocket propulsion engine in FIG. 1 operating in a first mode, according to an embodiment.
Figure 2B:
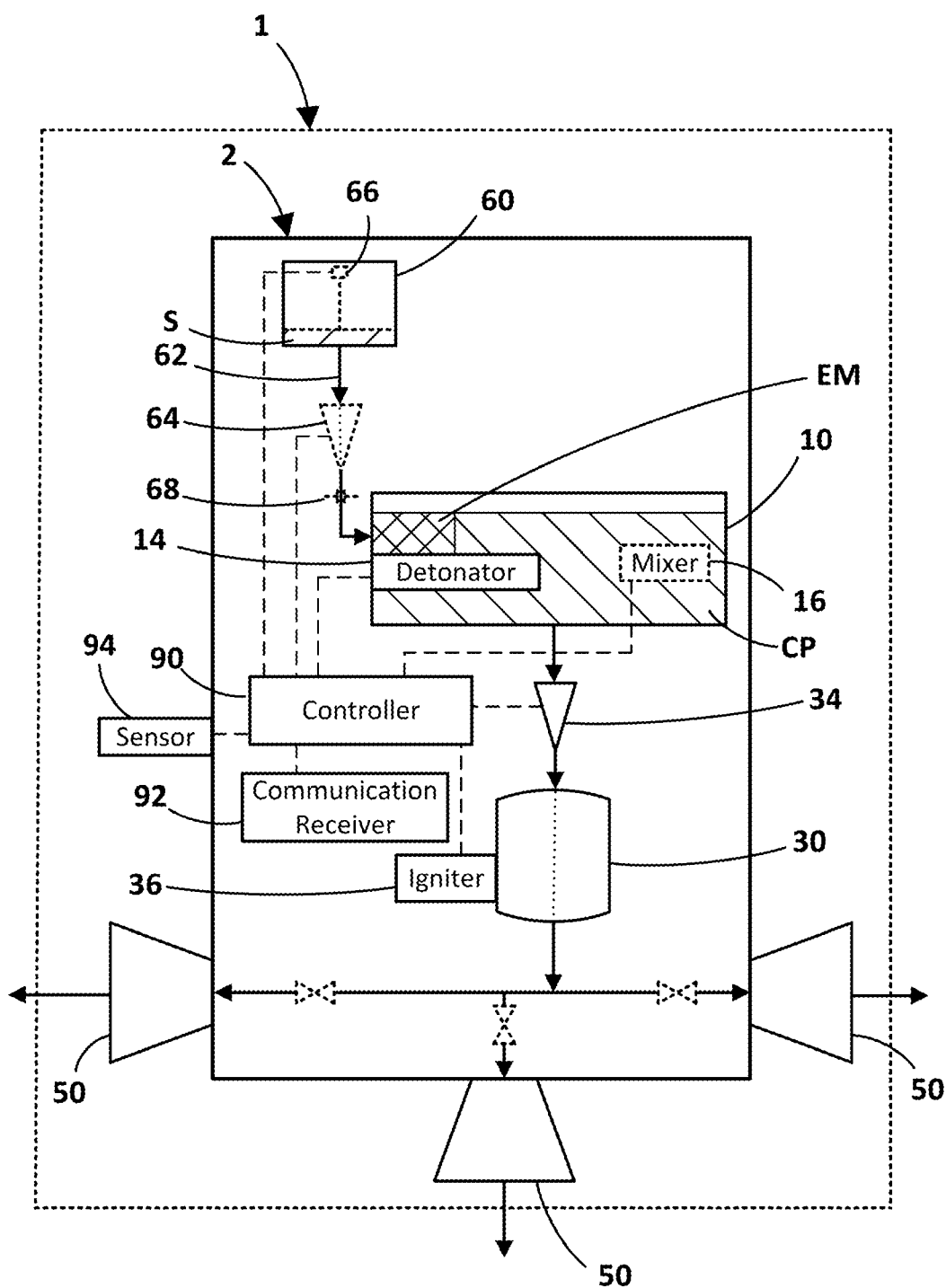
FIG. 2B is a schematic diagram of the rocket propulsion engine in FIG. 1 operating in a second mode, according to an embodiment.

In another embodiment, the rocket propulsion engine 2 can be used solely for midflight diversion and attitude control of the rocket 1. For example, the rocket 1 includes the rocket propulsion engine 2 and at least one primary rocket propulsion motor 4 as shown in FIG. 1. The primary rocket propulsion motor 4 is used for a main acceleration stage of the rocket 1 (e.g., during the initial boost/acceleration stage of the rocket 1), and the rocket propulsion engine 2 is used for diversion and attitude control of the rocket 1. For example, the rocket propulsion engine 2 may be configured to only provide non-axial propulsion of the rocket 1 (i.e., does not provide axial propulsion). The rocket propulsion engine 2 may not operate during the initial boost/main acceleration stage of the rocket 1. The primary rocket motor 4 may be jettisoned from the rocket 1 after completing the main acceleration stage of the rocket 1 (e.g., as shown in FIGS. 2A and 2B).

As shown in FIG. 1, the rocket propulsion engine 2 includes a propellant vessel 10, a combustion chamber 30, and one or more exhaust nozzles 50. The rocket propulsion engine 2 also includes a sensitizer vessel 60 fluidly connected to the propellant vessel 10. For example, FIG. 1 shows the rocket propulsion engine 2 during storage and just prior to launch (e.g., in a storage mode, in a pre-launch mode). As shown in FIG. 1, the rocket propulsion engine 2 can include an outer housing 3 containing the different components of the rocket propulsion engine 2.

The propellant vessel 10 contains combustible propellant CP. In an embodiment, the combustible propellant CP is a monopropellant. The combustible propellant CP when combusted produces combustion gas. The combustible propellant CP by itself is not explosive (e.g., the combustible propellant CP has a flame speed of less than a speed of sound through the combustible propellant CP, and when combusted does not form a supersonic shock wave). The combustible propellant CP can be a solid, a liquid, or a combination thereof.

In one example, the combustible propellant CP contains nitromethane. In an embodiment, the combustible propellant CP contains nitromethane and one or more gelling agents. One example of a gelling agent is nitrocellulose. In an embodiment, the combustible propellant CP has a specific impulse of at least 200 sec. In an embodiment, the combustible propellant CP has a density specific impulse of at least 200 N-sec/L$^3$.

The propellant vessel 10 is fluidly connected to the combustion chamber 30 via a propellant flow path 32. The propellant flow path 32 can extend from the propellant vessel 10 to the combustion chamber 30 (e.g., from an outlet of the propellant vessel 10 to an inlet of the combustion chamber 30). The combustion chamber 30 receives combustible propellant CP from the propellant vessel 10 via the propellant flow path 32. The rocket propulsion engine 2 includes a propellant flow controller 34 disposed in the propellant flow path 32. The propellant flow controller 34 controls the flow of the combustible propellant CP through the propellant flow path 32 (e.g., controls flow of combustible propellant CP from the propellant vessel 10 into the combustion chamber 30 via the propellant flow path 32). The propellant flow controller 34 may be, for example, a control valve, a propellant injector, or the like. In an embodiment, the propellant flow controller 34 is a propellant injector.

The combustion chamber 30 is configured to combust the combustible propellant CP within the combustion chamber 30. The combustion of the combustible propellant CP produces combustion gas. The combustion chamber 30 heats the combustible propellant CP to a temperature that causes the combustible propellant CP to combust. The combustion chamber 30 can include an ignitor 36 that heats the combustible propellant CP within the combustion chamber 30 until the combustible propellant CP combusts. The ignitor 36 may be an electric ignitor, a pilot light, or the like.

The combustion chamber 30 is fluidly connected to one or more exhaust nozzles 50. The combustion chamber 30 is configured to exhaust combustion gas through the exhaust nozzle(s) 50. The combustion gas resulting from the combustion of the combustible propellant CP within the combustion chamber 30 is exhausted through the exhaust nozzle(s) 50. For example, an exhaust flow path 52 fluidly connects the combustion chamber 30 to the exhaust nozzle(s) 50.

In an embodiment, the combustible propellant CP can be a combustible monopropellant, and the ignitor 36 may be a pilot light that utilizes a flow of the combustible monopropellant CP as fuel. As shown by the dashed arrow in FIG. 2A, the rocket propulsion engine 2 can be configured to supply a flow of the combustible monopropellant CP from the propellant vessel 10 to the pilot light. The rocket propulsion engine 2 may include a pilot light propellant flow controller for controlling the flow of the combustible monopropellant CP through a monopropellant flow path extending from the propellant vessel 10 to the pilot light. Alternatively, the monopropellant flow path to the pilot light can be branched off from the propellant flow path 32. The pilot light propellant flow controller can have similar features as discussed herein for the propellant flow controller 34. The flame of the pilot light is formed by the pilot light combusting the combustible propellant CP.

As shown in the illustrated embodiment, the rocket propulsion engine 2 can include a plurality of exhaust nozzles 50 that are provided to face in different directions. The exhaust nozzles 50 facing in different directions can provide propelling thrust as well as attitude adjustment of the rocket propulsion engine 2 and the rocket 1. For example, the rocket propulsion engine 2 may include at least one exhaust nozzle 50 facing in each cardinal direction (e.g., left, right, into the page, and out of the page in FIG. 1). The rocket propulsion engine 2 may also include a larger number of exhaust nozzles 50 than four for allowing finer adjustments of pitch, yaw, and roll of the rocket propulsion engine 2 and the rocket 1.

When the rocket propulsion engine 2 has multiple exhaust nozzles 50, the rocket propulsion engine 2 can include one or more exhaust valves 54 for controlling which of the exhaust nozzles 50 that the combustion gas is exhausted through. For example, the rocket propulsion engine 2 may include an exhaust valve 54 for each of the exhaust nozzles 50. The exhaust valves 54 can be adjusted (e.g., opened, closed) to change/control how much of the combustion gas is exhausted through each of the exhaust nozzles 50.

The combustion chamber 30 can have periods of inactivity during flight (e.g., between one flight correction and the next flight correction). During such periods, the combustible propellant CP may not be supplied into the combustion chamber 30. In one example, the ignitor 36 can remain active during inactivity of the combustion chamber 30. This can allow for quickly generating thrust without having to wait for activation of the ignitor 36.

In the illustrated embodiment, the rocket propulsion engine 2 includes a single combustion chamber 30 exhausting into a plurality of exhaust nozzles 50. In another embodiment, the rocket propulsion engine 2 may have multiple combustion chambers 30 that exhaust to multiple exhaust nozzles 50. Each combustion chamber 30 may exhaust to a respective one of the exhaust nozzles 50 (e.g., a combustion chamber 30 for each exhaust nozzle 50). For each combustion chamber 30, the rocket propulsion engine 2 can include a respective propellant flow path 32 that fluidly connects the propellant vessel 10 to the respective combustion chamber 30. A respective propellant flow controller 34 can be disposed in each propellant flow path 32 that controls flow of the combustible propellant CP therethrough.

A sensitizer vessel 60 contains a sensitizer S. The sensitizer S and the combustible propellant CP are different substances/materials. The sensitizer S is discussed in more detail below. The sensitizer vessel 60 is fluidly connected to the propellant vessel 10 by a sensitizer flow path 62. As shown in FIG. 1, the sensitizer flow path 62 can extend from the sensitizer vessel 60 to the propellant vessel 10 (e.g., extends from an outlet of the sensitizer vessel 60 to an inlet of the propellant vessel 10). The rocket propulsion engine 2 includes at least one of a sensitizer flow controller 64 and the ejector 66 for introducing the sensitizer S from the sensitizer vessel 60 into the propellant vessel 10. A mechanism for causing injection of the sensitizer S from the sensitizer vessel 60 into the propellant vessel 10, such as with the sensitizer flow controller 64 and/or the ejector 66, may be referred to as a controllable sensitizer injector or a controllable sensitizer injection mechanism.

The rocket propulsion engine 2 can include the sensitizer flow controller 64 disposed in the sensitizer flow path 62. The sensitizer flow controller 64 is configured to control flow of the sensitizer S through the sensitizer flow path 62 (e.g., control flow of sensitizer S from the sensitizer vessel 60 into the propellant vessel 10 via the sensitizer flow path 62). The sensitizer flow controller 64 may be, for example, a valve (e.g., a control valve, an on-off valve, a gate valve, etc.), a pump, or the like.

The rocket propulsion engine 2 can also or alternatively include the ejector 66 for the sensitizer vessel 60. The ejector 66 is configured to push the sensitizer S out of the sensitizer vessel 60 and into the sensitizer flow path 62. When the ejector 66 is activated, at least a portion of the sensitizer S is pushed/ejected from the sensitizer vessel 60 and through the sensitizer flow path 62 and into the propellant vessel 10. The ejector 66 may be, for example, a pyrotechnic actuator, an electromechanical actuator, a compressed gas actuator, or the like. In one example, the ejector 66 and sensitizer vessel 60 act as an actuated syringe for injecting sensitizer S into the propellant vessel 10. For example, the ejector 66 may include a vessel containing compressed gas, and the activation of the ejector 66 causes the compressed gas to drive an actuator to push/eject the sensitizer S from the sensitizer vessel 60 through the sensitizer flow path 62 into the propellant vessel 10.

In an embodiment, a breakable seal 68 may be provided to prevent premature flow of the sensitizer S through the sensitizer flow path 62. The seal 68 can be located at any suitable location for preventing premature flow of the sensitizer S. For example, the seal 68 can be located in the sensitizer flow path 62, or located at the outlet of the sensitizer vessel 60, or located at the inlet of the propellant vessel 10. For example, the seal 68 may be configured so that the force/pressure of the ejection of the sensitizer S into/through the sanitizer flow path 62 breaks the breakable seal 68.

In an embodiment, the propellant vessel 10 may include a mixer 16. The mixer 16 is configured to mix different components within the propellant vessel 10. For example, the mixer 16 when activated may mix the sensitizer S with the combustible propellant CP within the propellant vessel 10. Mixing within the propellant vessel 10 will be discussed in more detail below.

The propellant vessel 10 includes a detonator 14. As shown in FIG. 2A, the detonator may be disposed within the propellant vessel 10, on the outside of the propellant vessel 10, and/or extend into the propellant vessel 10. When activated, the detonator 14 is configured to trigger detonation of the explosive mixture EM within the propellant vessel 10 that is created when the sensitizer S is mixed with the combustible propellant CP. The activation/triggering of the detonator 14 does not cause detonation of the combustible propellant CP by itself (i.e., without the sensitizer S). For example, the explosive force/energy released from the activated/triggered detonator 14 is less than the activation energy for causing detonation of the combustion propellant CP (without the sensitizer 14). In comparison, the energy released from the activated/triggered detonator 14 is sufficient to cause detonation of the sensitized combustible propellant (i.e., cause detonation of the explosive mixture EM). For example, the detonator 14 can be a blasting cap. The detonator 14 is discussed in more detail below.

The rocket propulsion engine 2 also includes a programmable electronic controller 90. The controller 90 controls operation of the rocket propulsion engine 2. For example, the controller 90 can be connected to (e.g., electrically connected or the like) and controls the detonator 14, the propellant flow controller 34, the ignitor 36, and the controllable sensitizer injector (e.g., the sensitizer flow controller 64 when present and/or the ejector when present). The controller 90 may also be connected to and control the mixer 16 and the exhaust valve(s) 54.

The controller 90 may be the controller of the rocket 1 or dedicated to controlling the rocket propulsion engine 2 separate from a controller used to control the rocket 1. In an embodiment, the controller 90 includes a memory for storing information (e.g., operating instructions, etc.) and a processor. The controller 90 is shown in FIG. 1 as a single integrated control unit. It should be appreciated that the controller 90 may be a single integrated control unit or a distributed network of controller elements.

The controller 90 can receive remote communications via a communications receiver 92. For example, the controller 90 may receive a remote detonation command via the communications receiver 92. The rocket 1 can include an external object sensor 94 for detecting objects near the rocket 1, and the controller 90 can be in communication with the external object sensor 94. For example, the external object sensor can detect a target and send a detonation command to the controller 90 when the rocket 1 is near the target. The external object sensor 94 may include one or more of a radar, an infrared light sensor (e.g., IR seeker), or the like.

FIG. 2A is a schematic diagram of the rocket propulsion engine 2 operating in a first mode, according to an embodiment. The first mode can be referred to as an acceleration mode or a flight adjustment mode. The rocket propulsion engine 2 is in the first mode during a take-off and/or during flight of the rocket propulsion engine 2. In an embodiment, the rocket propulsion engine 2 is in the first mode during the flight of the rocket propulsion engine 2. In the first mode, the propellant flow controller 34 and the ignitor 36 are activated. For example, the controller 90 activates the propellant flow controller 34 and the ignitor 36 for the first mode.

As shown in FIG. 2A, the activated propellant flow controller 34 permits a stream of combustible propellant CP to flow through the propellant flow path 32 and into the combustion chamber 30.

The combustion chamber 30 combusts the combustible propellant CP within the combustion chamber 30. The ignitor 36 heats the combustible propellant CP in the combustion chamber 30 causing the combustion of the combustible propellant CP within the combustion chamber 30. For example, the ignitor 36 heats the combustible propellant CP to at least a temperature that initiates combustion of the combustible propellant CP (e.g., at least the temperature that initiates decomposition of the combustible propellant CP, at least the temperature that initiates redox reaction of the combustible propellant CP). The combustible propellant CP combusts to produce combustion gas. The combustion gas is then exhausted from the combustion chamber 30 to and through the one or more exhaust nozzles 50.

The flow of combustion gas from the nozzle(s) 50 generates thrust that accelerates the rocket propulsion engine 2. The combustion gas can be exhausted through at least one exhaust flow path 52 to one or more of the exhaust nozzle(s) 50. The rocket propulsion engine 2 may include one or more exhaust valves 54 in the exhaust flow path(s) 52 to control which of the exhaust nozzle(s) 50 that the combustion gas is exhausted through, and to provide attitude control of the rocket propulsion engine 2. For example, the rocket propulsion engine 2 may include a valve 54 in the exhaust flow path(s) 52 for each of the exhaust nozzle(s) 50. The controller 90 can be configured to control each of the valves 54 for the exhaust nozzle(s) 50 to control the thrust vector of the rocket propulsion engine 2.

FIG. 2B is a schematic diagram of the rocket propulsion engine 2 operating in a second mode, according to an embodiment. The second mode may also be referred to as a mixing mode or a detonation mode. The rocket propulsion engine 2 can be operated in the second mode during the flight of the rocket propulsion engine 2 (e.g., after the take-off of the rocket 1). As shown in FIG. 2B, the rocket propulsion engine 2 may operate in the second mode after at least some of the combustion propellant CP contained in the propellant vessel 10 has been combusted within the combustion chamber 30. In the second mode, at least one of the sensitizer flow controller 64 and the ejector 66 is activated by the controller 90.

The activation of the sensitizer injector (such as the sensitizer flow controller 64 and/or the ejector 66) causes the sensitizer S to flow from the sensitizer vessel 60 into the propellant vessel 10. The illustrated embodiment of the rocket propulsion engine 2 includes both the sensitizer flow controller 64 and the ejector 66. In other embodiments, the rocket propulsion engine 2 may have just one of the sensitizer flow controller 64 and the ejector 66.

In the case of the ejector 66, the activation of the ejector 66 causes the ejector 66 to push the sensitizer S from the sensitizer vessel 60 and into the propellant vessel 10. The activated ejector 66 pushes the sensitizer S within the sensitizer vessel 60 into the sensitizer flow path 62. The sensitizer S flows through the sensitizer flow path 62 into the propellant vessel 10. In an embodiment, the ejector 66 can include an actuator and a plunger, and the activation of the ejector 66 causes the actuator to move the plunger within the sensitizer vessel 60 pushing/squeezing the sensitizer S within the sensitizer vessel 60 into and through the sensitizer flow path 62 and into the propellant vessel 10. When the breakable seal 68 is present, the force of the sensitizer S being forced into/through the sensitizer flow path 62 also breaks the breakable seal 68.

In the case of the sensitizer flow controller 64, the activation of the sensitizer flow controller 64 allows for the sensitizer S to flow through the sensitizer flow path 62 into the propellant vessel 10. In an embodiment, the sensitizer flow controller 64 may be a valve, and the activation may be opening of the closed valve that allows sensitizer S to flow through the sensitizer flow path 62 into the propellant vessel 10. For example, the internal pressure within the sensitizer vessel 60, the force of the acceleration of rocket propulsion engine 2, gravity, pushing force from the ejector 66, or the like can cause the sensitizer S within the sensitizer vessel 60 to flow into the sensitizer flow path 62. In an embodiment, the sensitizer flow controller 64 may be a pump, and the activated pump pumps the sensitizer S from the sensitizer vessel 60 into the propellant vessel 10 via the sensitizer flow path 62.

As noted above, the sensitizer injector may include the ejector 66, the sensitizer flow controller 64, or both the ejector 66 and the sensitizer flow controller 64. In an embodiment, the sensitizer flow controller 64 may be a valve provided along with the ejector 66 in which the sensitizer flow controller 64/valve prevents premature flow of the sensitizer S through the sensitizer flow path 62. The sensitizer flow controller 64/valve being activated to open along with the activation of the ejector 66 (e.g., the sensitizer flow controller 64/valve being opened prior to or at the same time as the ejector 66). When the sensitizer flow controller 64 is not present, the breakable seal 68 can be present to prevent the premature flow of the sensitizer S through the sensitizer flow path 62.

The sensitizer S flows into the propellant vessel 10 that also contains the combustible propellant CP. The sensitizer S mixes with the combustible propellant CP within the propellant vessel forming an explosive mixture EM within the propellant vessel 10. For example, the sensitizer S is a substance that sensitizes the combustible propellant CP into an explosive mixture/compound. The explosive mixture EM can be a liquid, a solid, or a combination thereof.

In an embodiment, the sensitizer S is not explosive by itself (e.g., when contained in the sensitizer vessel 60 separate from the combustible propellant). In an embodiment, the sensitizer S is an amine. For example, the sensitizer S can be ethylene diamine (EDA). The sensitizer S can be a liquid, a solid, or a combination thereof. It should be appreciated that the sensitizer S can be a non-explosive compound selected based on the type of combustible propellant CP being used (i.e., a non-explosive compound that sensitizes the combustible propellant into an explosive).

In an embodiment, the explosive mixture EM contains at least 50% of the combustible propellant CP. In another embodiment, the explosive mixture EM contains at least 75% of the combustible propellant CP. In another embodiment, the explosive mixture EM contains at least 90% of the combustible propellant CP.

As shown in FIG. 2B, only a portion of the combustible propellant CP contained within the propellant vessel 10 needs to be mixed with the sensitizer S to form the explosive mixture EM. For example, the propellant vessel 10 still contains combustible propellant CP separate from the explosive mixture EM (i.e., not mixed with the sensitizer S). The explosive mixture EM can be formed so as to be disposed at or near the detonator 14 within the propellant vessel 10, such that the activation of the detonator 14 triggers the detonation of the explosive mixture EM. For example, the propellant vessel 10 can be configured such that the explosive mixture EM is formed in contact with the detonator 14, as shown in FIG. 2B. The explosive force released by the detonation of the explosive mixture EM can cause detonation of the non-sensitized combustible propellant CP (i.e., any combustible propellant not contained in the explosive mixture, combustible propellant not mixed with the sensitizer) within the propellant vessel 10. A cloud of the combustible propellant CP and the sensitizer S forms enough detonable explosive mixture EM (within the propellant vessel 10, for example, near the detonator 14) to provide the explosive force necessary to cause detonation of the remaining non-sensitized combustible propellant CP within the propellant vessel 10. For example, the rocket propulsion engine 2 can be configured to form an amount of explosive mixture EM within the propellant vessel 10 that when detonated (by the detonator 14), generates a sufficient explosive force to cause detonation of any remaining non-sensitized combustible propellant within the propellant vessel 10.

In one embodiment, a majority of the combustible propellant CP contained within the propellant vessel 10 may be mixed with the sensitizer S to form the explosive mixture EM. In another embodiment, substantially all of the combustible propellant CP contained within the propellant vessel 10 may be mixed with sensitizer S to form the explosive mixture EM. For example, the mixer 16 may be used to mix the sensitizer S into some or all of the combustible propellant CP contained within the propellant vessel 10.

The detonator 14 triggers detonation of the explosive mixture EM within the propellant vessel 10. The controller 90 is configured to activate the detonator 14. The activation of the detonator 14 may cause self-detonation of the detonator 14 to cause detonation of the explosive mixture EM (e.g., the detonation/explosion of the detonator 14 provides the activation energy to detonate/explode the explosive mixture EM). For example, the detonation of the detonator 14 by itself is not sufficient to destroy the rocket propulsion engine 2 (e.g., detonation of the detonator 14 without the explosive mixture EM, i.e. in the first mode, is not sufficient to cause the desired destruction of the rocket propulsion engine/rocket).

The detonation of the explosive mixture EM destroys the rocket propulsion engine 2 and destroys/explodes the rocket 1. For example, the detonation of the explosive mixture EM may be used to abort the rocket 1. In an embodiment, the controller 90 may be configured to active the detonator 14 in response to receiving a remote detonation instruction (e.g., received via the communications receiver 92). For example, the detonation of the explosive mixture EM may be used to detonate the rocket 1 near a target (e.g., near an asteroid, before impacting a target, etc.) to destroy the target or cause a deviation of the target. In one embodiment, the controller 90 may be configured to activate the detonator 14 based on external sensor readings (e.g., detections by one or more external object sensor(s) 94 such as a radar, an infrared sensor, or the like) of the rocket propulsion engine 2 and the rocket 1.

As shown in FIG. 2B, the combustion of the propellant CP within the combustion chamber 30 can still occur while the explosive mixture EM is within the propellant vessel 10. For example, the combustion chamber 30 can combust the combustible propellant CP during the introduction of the sensitizer S into the propellant vessel 10. For example, the combustion chamber 30 can combust the combustible propellant CP after the rocket propulsion engine 2 has completed the introduction of the sensitizer S into the propellant vessel 10 and the forming of the explosive mixture EM within the propellant vessel 10. In an embodiment, the combustion chamber 30 may be configured to also combust the explosive mixture EM to produce combustion gas. Combustion of the explosive mixture EM within the combustion chamber 30 includes combustion of the combustible propellant CP contained within the explosive mixture EM. In one example, the rocket propulsion engine 2 may inject the sensitizer S prior to combusting any of the combustible propellant CP within the combustion chamber 30, such that all of the combustible propellant CP combusted in the combustion chamber 30 is combustible propellant CP mixed with the sensitizer S (i.e., the combustion chamber 30 only combusts the explosive mixture EM).

Figure 3:
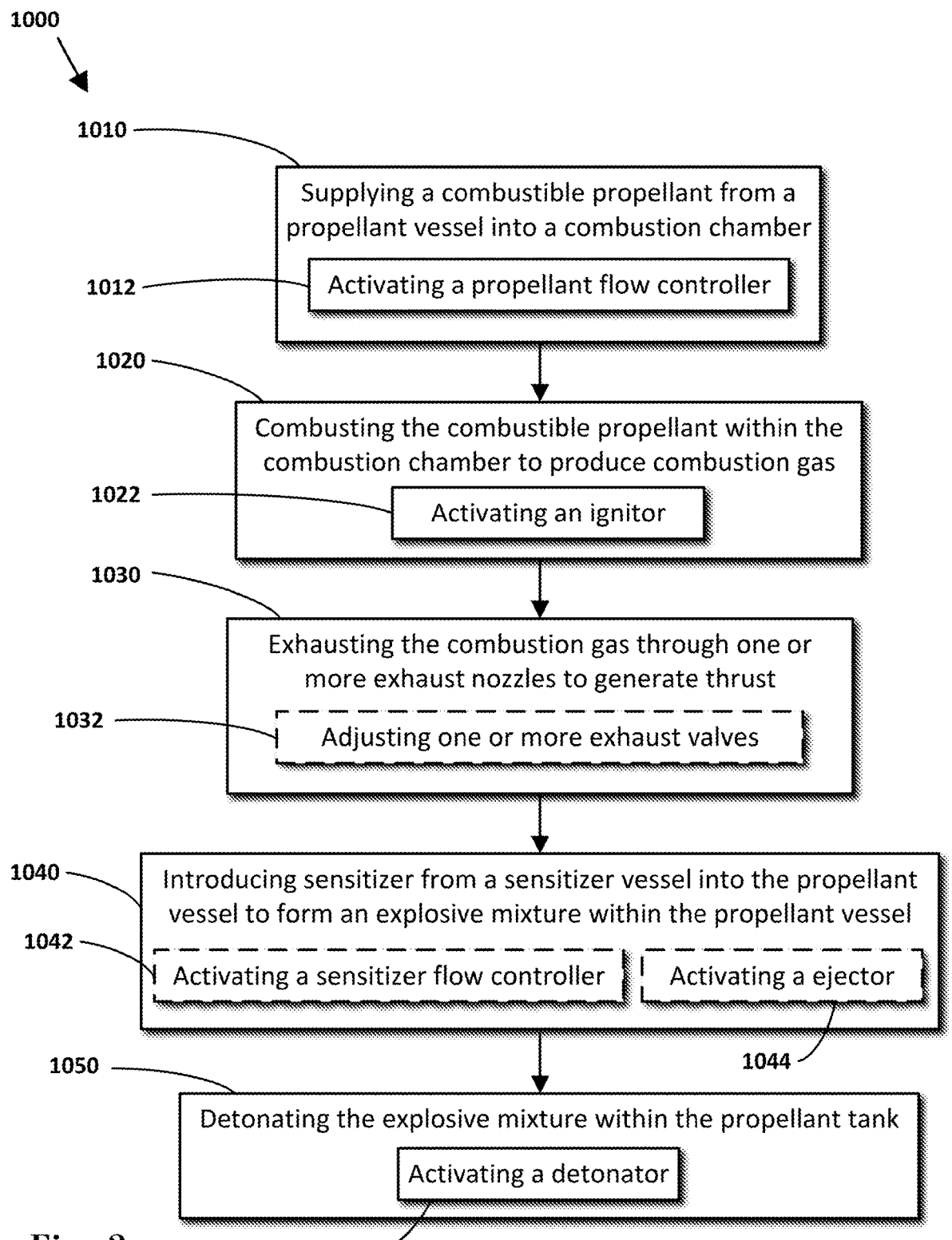
FIG. 3 is a block flow diagram of an embodiment of a method of operating a rocket propulsion engine.

FIG. 3 is a block flow diagram of an embodiment of a method 1000 of operating a rocket propulsion engine. The method 1000 may be used to operate the rocket propulsion engine 2 in FIGS. 1-2B. For example, the method 1000 may be implemented by the controller 90 of the rocket propulsion engine 2. The method 1000 starts at 1010.

At 1010, combustible propellant (e.g., the combustible propellant CP) is supplied from a propellant vessel (e.g., the propellant vessel 10) into a combustion chamber (e.g., combustion chamber 30). The supplying of the combustible propellant at 1010 can include activating a propellant flow controller (e.g., propellant flow controller 34) at 1012. For example, the activated propellant flow controller injects/allows the propellant to flow from the propellant vessel into the combustion chamber via a propellant flow path (e.g., the propellant flow path 32). The method 1000 then proceeds to 1020.

At 1020, the combustible propellant is combusted within the combustion chamber to produce combustion gas. For example, the combustion of the propellant can be a decomposition reaction in which the propellant decomposes into the combustion gas. Within the combustion chamber, the combustible propellant is heated until it reacts/combusts. The combusting of the propellant at 1020 can include activating an ignitor (e.g. the ignitor 36) at 1022. The activated ignitor can be configured to heat the combustible propellant within the combustion chamber until it reacts/combust. In an embodiment, the activating of the ignitor at 1022 may include activating a pilot light for the combustion chamber. The method 1000 then proceeds to 1030.

At 1030, the combustion gas is exhausted through one or more nozzles to generate thrust. The exhausting of the combustion gas at 1030 can include adjusting one or more exhaust valves (e.g., exhaust valves 54) at 1032. The adjusting of the exhaust valve(s) at 1032 includes opening and/or closing at least one exhaust valve. The adjusting of the exhaust vale(s) 1032 controls which of the nozzles the product gas is exhausted through. The product gas can be exhausted through a specific one or more of the nozzles to changes the thrust vector of the rocket propulsion engine 2. The method 1000 then proceeds to 1040.

At 1040, sensitizer (e.g., sensitizer S) from a sensitizer vessel (e.g., sensitizer vessel 60) is introduced into the propellant vessel to form an explosive mixture (e.g., explosive mixture EM) within the propellant vessel. The sensitizer mixes with the propellant within the propellant vessel to form the explosive mixture. In an embodiment, the flow of the sensitizer into the propellant vessel may cause sufficient mixing of the sensitizer with propellant to form the explosive mixture. In an embodiment, a mixer (e.g., mixer 16) may be activated that mixes the sensitizer into the propellant within the propellant vessel.

The introduction of the sensitizer into the propellant vessel at 1040 may be achieved using a suitable sensitizer injector such as one or more of 1042 and 1044. At 1042, a sensitizer flow controller (e.g., sensitizer flow controller 64) is activated, and the sensitizer flow controller allows the sensitizer to flow from the sensitizer vessel into the propellant vessel via a sensitizer flow path (e.g., sensitizer flow path 62). At 1042, an ejector (e.g., ejector 66) for the sensitizer vessel is activated, and the ejector pushes the sensitizer out of the sensitizer vessel and into the propellant vessel. The method 1000 then proceeds to 1050.

At 1050, the explosive mixture within the propellant vessel is detonated. The detonating of the explosive mixture at 1050 can include activating a detonator (e.g., detonator 14) at 1052. The detonation of the explosive mixture at 1050 destroys/explodes the rocket propulsion engine 2 and the rocket 1.

Steps 1010, 1020, and 1030 can be part of a first operation mode of the rocket propulsion engine, and steps 1040 and 1050 are part of a second operation mode of the rocket propulsion engine. For example, steps 1010, 1020, 1030 can occur at and/or during the flight of the rocket, while steps 1040 and 1050 can occur during the flight of the rocket. In an embodiment, steps 1010, 1020, and 1030 occur at least once prior to step 1040. In one embodiment, steps 1010, 1020, and 1030 may occur at least once prior to step 1040 and are repeated at least once after step 1040 and prior to step 1050. In such an embodiment, step 1020 occurring after step 1040 may combust the combustible propellant or the explosive mixture EM within the combustion chamber. The combustion of the explosive mixture EM within the combustion chamber occurs in a manner that does not cause detonation of the remaining explosive mixture EM within the propellant vessel. In one embodiment, steps 1010, 1020, and 1030 can occur during and/or after step 1040. In such an embodiment, the combustion of the combustible propellant at 1020 is combustion of the combustible propellant contained in the explosive mixture.

It should be appreciated that the method 1000 may be modified based on the rocket 1 and the rocket propulsion engine 2 as shown in FIGS. 1-2B and described above.

The terminology used herein is intended to describe particular embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components. In an embodiment, "connected" and "connecting" as described herein can refer to being "directly connected" and "directly connecting".

With regard to the preceding description, it is to be understood that changes may be made in detail, especially in matters of the construction materials employed and the shape, size, and arrangement of parts without departing from the scope of the present disclosure. This Specification and the embodiments described are exemplary only, with the true scope and spirit of the disclosure being indicated by the claims that follow.

The invention claimed is:

1. A rocket propulsion engine, comprising:
   a propellant vessel containing a combustible propellant that is not explosive;
   a combustion chamber fluidly connected to the propellant vessel via a propellant flow path to receive the combustible propellant therefrom;
   an exhaust nozzle fluidly connected to the combustion chamber so as to exhaust combustion gas produced in the combustion chamber resulting from combustion of the combustible propellant;
   a sensitizer vessel containing a sensitizer, the sensitizer vessel is fluidly connected to the propellant vessel via a sensitizer flow path; and
   a controllable sensitizer injector that is configured to introduce the sensitizer from the sensitizer vessel into the propellant vessel via the sensitizer flow path to form an explosive mixture of the propellant and the sensitizer within the propellant vessel.

2. The rocket propulsion engine of claim 1, wherein the combustible propellant is a monopropellant.

3. The rocket propulsion engine of claim 1, wherein the sensitizer, the combustible propellant, and the explosive mixture are each respectively one or more of a liquid and a solid.

4. The rocket propulsion engine of claim 1, wherein the combustible propellant has a specific impulse of at least 200 seconds.

5. The rocket propulsion engine of claim 1, wherein the propellant vessel includes a detonator.

6. The rocket propulsion engine of claim 5, wherein the detonator is incapable of causing detonation of the combustible propellant without the sensitizer.

7. The rocket propulsion engine of claim 1, wherein the controllable sensitizer injector comprises a sensitizer flow controller in the sensitizer flow path and/or a sensitizer ejector associated with the sensitizer vessel.

8. A rocket propulsion engine, comprising:
   a propellant vessel containing a combustible propellant and having a detonator;
   a combustion chamber having an ignitor;
   a propellant flow path fluidly connecting the propellant vessel and the combustion chamber, and a propellant flow controller in the propellant flow path that controls the flow of propellant through the propellant flow path;
an exhaust nozzle fluidly connected to the combustion chamber;
a sensitizer vessel containing a sensitizer;
a sensitizer flow path fluidly connecting the sensitizer vessel and the propellant vessel,
a controllable sensitizer injector that controls the flow of sensitizer through the sensitizer flow path;
a controller that is connected to the propellant flow controller, the ignitor, the controllable sensitizer injector, and the detonator, the controller is configured to:
  activate the propellant flow controller to supply the combustible propellant from the propellant vessel to the combustion chamber,
  activate the ignitor to heat and combust the combustible propellant within the combustion chamber to produce combustion gas, the combustion gas exhausted through the exhaust nozzle,
  activate the controllable sensitizer injector to introduce the sensitizer from the sensitizer vessel into the propellant vessel to form an explosive mixture of the combustible propellant and the sensitizer within the propellant vessel, and
  trigger the detonator to cause a detonation of the explosive mixture within the propellant vessel.

9. The rocket propulsion engine of claim 8, wherein the combustible propellant is a monopropellant.

10. The rocket propulsion engine of claim 8, wherein the detonator is incapable of causing detonation of the combustible propellant without the sensitizer.

11. The rocket propulsion engine of claim 8, wherein the sensitizer, the combustible propellant, and the explosive mixture are each respectively one or more of a liquid and a solid.

12. The rocket propulsion engine of claim 8, wherein the combustible propellant has a specific impulse of at least 200 seconds.

13. The rocket propulsion engine of claim 8, wherein the controllable sensitizer injector comprises a sensitizer flow controller in the sensitizer flow path and/or a sensitizer ejector associated with the sensitizer vessel.

14. A method of operating a rocket propulsion engine, comprising:
supplying a combustible propellant from a propellant vessel into a combustion chamber, and
combusting the combustible propellant within the combustion chamber to produce combustion gas, and exhausting the combustion gas through an exhaust nozzle to generate thrust;
introducing sensitizer from a sensitizer vessel into the propellant vessel to form an explosive mixture of the sensitizer and the combustible propellant within the propellant vessel;
detonating the explosive mixture within the propellant vessel.

15. The method of claim 14, wherein the supplying of the combustible propellant from the propellant vessel into the combustion chamber includes activating a propellant flow controller disposed in a propellant flow path that fluidly connects the propellant vessel to the combustion chamber.

16. The method of claim 14, wherein the introducing of the sensitizer from the sensitizer vessel into the propellant vessel includes at least one of:
pushing, with an ejector, the sensitizer out of the sensitizer vessel,
activating a sensitizer flow controller disposed in a sensitizer flow path that fluidly connects the sensitizer vessel to the propellant vessel.

17. The method of claim 14, wherein the combusting of the combustible propellant within the combustion chamber to produce combustion gas includes:
heating, with an ignitor, the combustible propellant within the combustion chamber.

18. The method of claim 14, comprising:
changing a thrust vector of the rocket propulsion engine during flight, which includes the exhausting of the combustion gas through the exhaust nozzle to generate the thrust.

19. A method of operating a rocket propulsion engine, comprising:
launching a rocket having the rocket propulsion engine, at the time of launch the rocket not having a self-destruction capable explosive, wherein the rocket comprises a propellant vessel containing a combustible propellant that is not explosive; and
after the rocket is launched, forming a self-destruction capable explosive in the rocket propulsion engine, wherein forming the self-destruction capable explosive in the rocket propulsion engine comprises forming an explosive mixture by combining the combustible propellant and a sensitizer.

20. The method of claim 19, further comprising detonating the self-destruction capable explosive.

* * * * *